(12) United States Patent
Honda (10) Patent No.: US 6,542,785 B1
(45) Date of Patent: Apr. 1, 2003

(54) METHOD FOR DETERMINING WHETHER SOLUTIONS OF THREE-DIMENSIONAL MACHINING FUNCTIONS CAN BE FIGURED OUT BY AN ALGEBRAIC METHOD OR AN ANALYTIC METHOD

(75) Inventor: Kenichi Honda, Osaka (JP)

(73) Assignee: Kabushiki Kaisha F A Labo, Osaka (JP)

( * ) Notice: Subject to any disclaimer, the term of this patent is extended or adjusted under 35 U.S.C. 154(b) by 0 days.

(21) Appl. No.: 09/568,513

(22) Filed: May 11, 2000

(30) Foreign Application Priority Data

Jun. 11, 1999 (JP) .......................................... 11-164823

(51) Int. Cl.[7] .............................................. G06F 19/00
(52) U.S. Cl. ...................................... 700/187; 700/186
(58) Field of Search ................................. 700/186, 187, 700/194

(56) References Cited

U.S. PATENT DOCUMENTS 5,369,592 A * 11/1994 Honda .......................... 700/187
5,515,290 A    5/1996  Honda .......................... 700/187
6,044,309 A    3/2000  Honda .......................... 700/187

FOREIGN PATENT DOCUMENTS

EP    0411137 A1    2/1991
EP    0841606 A2    5/1998

OTHER PUBLICATIONS

European Search Report dated Nov. 17, 2000.

* cited by examiner

*Primary Examiner*—Leo P. Picard
*Assistant Examiner*—Ryan Jarrett
(74) *Attorney, Agent, or Firm*—Burns, Doane, Swecker & Mathis, LLP (57) ABSTRACT

Functions in various kinds of forms, whether to be rational functions or not, to express a plurality of curved surfaces are unified into a set of functions with respect to parameters u and v by an algebraic method or an analytical method. Based on the set of functions, intersections which are necessary for machining of the curved surfaces are calculated, and paths of a cutting tool to machine the curved surfaces are determined.

20 Claims, 5 Drawing Sheets

METHOD FOR DETERMINING WHETHER SOLUTIONS OF THREE-DIMENSIONAL MACHINING FUNCTIONS CAN BE FIGURED OUT BY AN ALGEBRAIC METHOD OR AN ANALYTIC METHOD

This application is based on application No. 11-164823 filed in Japan, the content of which is hereby incorporated by reference.

BACKGROUND OF THE INVENTION

1. Field of the Invention

The present invention relates to a three-dimensional machining method for machining a workpiece three-dimensionally with a machine tool such as a milling cutter, and more particularly to a processing control for defining a surface to be machined and determining paths of a cutting tool to machine the surface.

2. Description of Related Art

Recently, computerized three-dimensional machining of a metal workpiece has been developed for practical use. The three-dimensional machining is generally performed based on either paths of the working end of a ball tip of a cutting tool or paths of the center of the ball tip of the cutting tool.

Figure 7A:
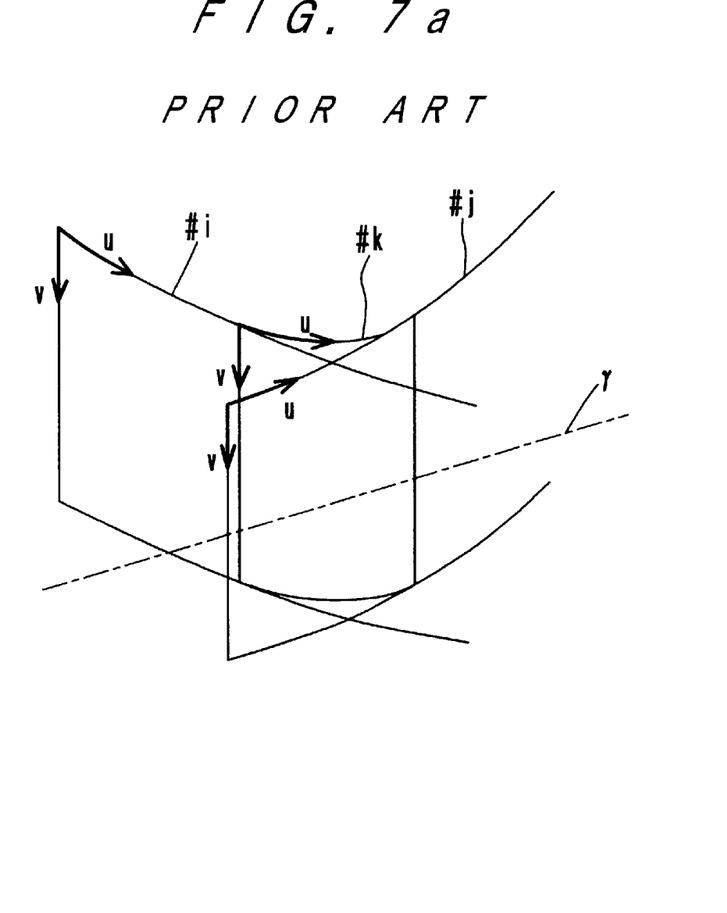
FIGS. 7a and 7b are illustrations which shows machining of continuous curved surfaces according to a conventional three-dimensional machining method.
Figure 7B:
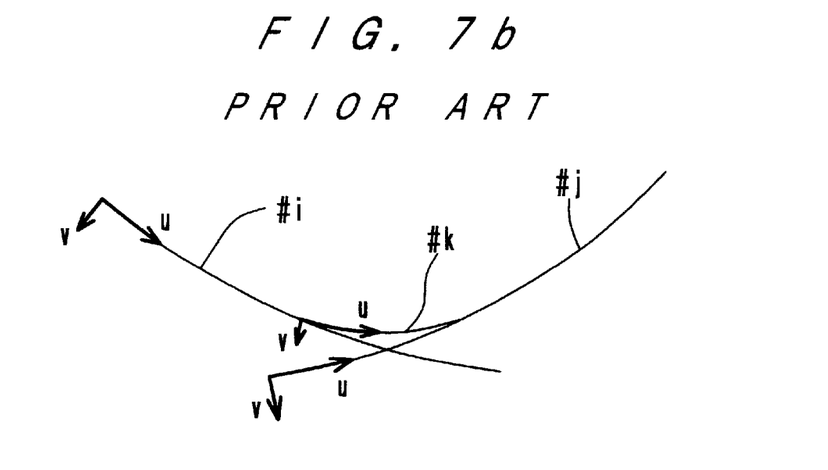

In either method, conventionally, a plurality of surfaces to be machined are defined individually, and continuous surfaces are machined by transfer cutting. For example, as FIGS. 7a and 7b show, three continuous surfaces #i, #j and #k are defined individually (in individual coordinate systems (u, v)) and are machined continuously by transferring a cutting tool from a path to machine the surface #i to a path to machine the surface #k and then to a path to machine the surface #j. In the transfer cutting, generation of tool paths is sometimes performed based on a direction γ which does not reflect the characteristics of the surfaces. In this case, the transfer cutting is not in accordance with the characteristics of the surfaces, and the cutting may be rough or may be unnecessarily fine and wasteful. Further, for transfer cutting, a large volume of processing to avoid interference of the cutting tool is necessary, which takes a lot of time.

In order to solve the above problems, the applicant disclosed, in U.S. Pat. No. 5,515,290, a three-dimensional machining method wherein a plurality of curved surfaces which have distinct characteristics are defined as a unified surface by a group of polynomials with the fourth or less degree with respect to parameters u and v, and paths of a cutting tool to machine the unified surface are calculated by using the polynomials. According to this method, the solutions can be obtained arithmetically, and points on the unified curved surface expressed in the coordinate system (u, v) can be converted into values in the rectangular coordinate system (x, y, z) speedily and vice versa. However, curved surfaces are generally defined in forms of spline, B-spline, nubus, bezier, etc. and are not always defined by polynomials, and therefore, in order to carry out calculation control in the above method using expressions in other forms, some conversion is necessary.

In order to solve this problem, the applicant further disclosed, in Japanese Patent No. 2824424, a three-dimensional machining method wherein a plurality of curved surfaces are defined by a set of rational functions with respect to parameters u and v, and intersections which are necessary for machining are calculated by using the set of rational functions. The calculation according to this method is to figure out the solutions of the rational functions, and according to this method, any forms of expressions to define curved surfaces can be unified into a set of rational functions with respect to parameters u and v. Thereby, the calculation time can be shortened, and the accuracy of machining can be improved.

Nowadays, however, more kinds of forms are adopted to define curved surfaces, and there are cases of defining curved surfaces by analytic functions which are no longer expressions. In other words, there are cases that a plurality of curved surfaces cannot be defined by a set of rational functions.

SUMMARY OF THE INVENTION

An object of the present invention is to provide a three-dimensional machining method wherein various kinds of functions to define curved surfaces can be taken in and unified into a set of functions, and speedy calculation for machining can be carried out.

Another object of the present invention is to provide a storage medium stored with a three-dimensional machining control program adopting the above method.

In order to attain the objects, in a three-dimensional machining method according to the present invention, functions in a plurality of forms which express a plurality of curved surfaces and curves are received; it is judged whether solutions of the functions can be figured out by an algebraic method or an analytic method; the solutions are calculated by an algebraic method or an analytic method depending on the judgement; and the plurality of curved surfaces are defined by a set of functions with respect to parameters u and v.

A curved surface is defined by a continuous function with respect to parameters u and v, and a curve is defined by a continuous function with respect to $S(u, v)$. Such a curved surface or a curve may be defined by an expression such as a polynomial or may be defined by a standard $S(u, v)$ not by an expression. According to the present invention, when curved surfaces and curves are expressed by any standards $S(u, v)=f(u, v)$, the points of intersection, the points of contact and the curves of intersection, etc. between the curved surfaces and curves are calculated directly, whereby the accuracy of the calculation is improved. Since this is executed to general continuous functions, needless to say, curved surfaces and curves defined by expressions can be handled in this way.

Calculating intersections means calculating the solutions of equations. The solution of an equation expressed by an analytic function can be figured out either by an algebraic method or an analytical method. If the solution can be figured out from an equation, an algebraic method is adopted. With respect to polynomials in the fourth or less degree, the solutions can be figured out by an algebraic method. On the other hand, if the solution cannot be figured out by an algebraic method, an analytical method is adopted. According to the present invention, it is possible to handle various kinds of functions.

At present, curved surfaces and curves are defined by functions in various forms; according to the present invention, however, it is possible to handle these functions together directly. Conventionally, various kinds of functions to define curved surfaces and curves are generally converted into functions in the same form (for example, nurbus, spline or the like) before calculation of intersection, and the accuracy of the calculation is not high. On the other hand, according to the present invention, various kinds of functions are handled directly and unified into a set of functions, and thereby, curved surfaces and curves defined by the set of functions are accurate.

According to the method disclosed by Japanese Patent No. 2824424, functions in the forms of nurbus, spline, bezier, etc. can be unified into a set of rational functions. The present invention is to unify general continuous functions, that is, to extend the range to which the technique disclosed by the patent is applicable.

BRIEF DESCRIPTION OF THE DRAWINGS

These and other objects and features of the present invention will be apparent from the following description with reference to the accompanying drawings, in which.

DETAILED DESCRIPTION OF THE PREFERRED EMBODIMENTS

An embodiment of a three-dimensional machining method and a storage medium according to the present invention is described with reference to the accompanying drawings.

Machining Apparatus

Figure 1:
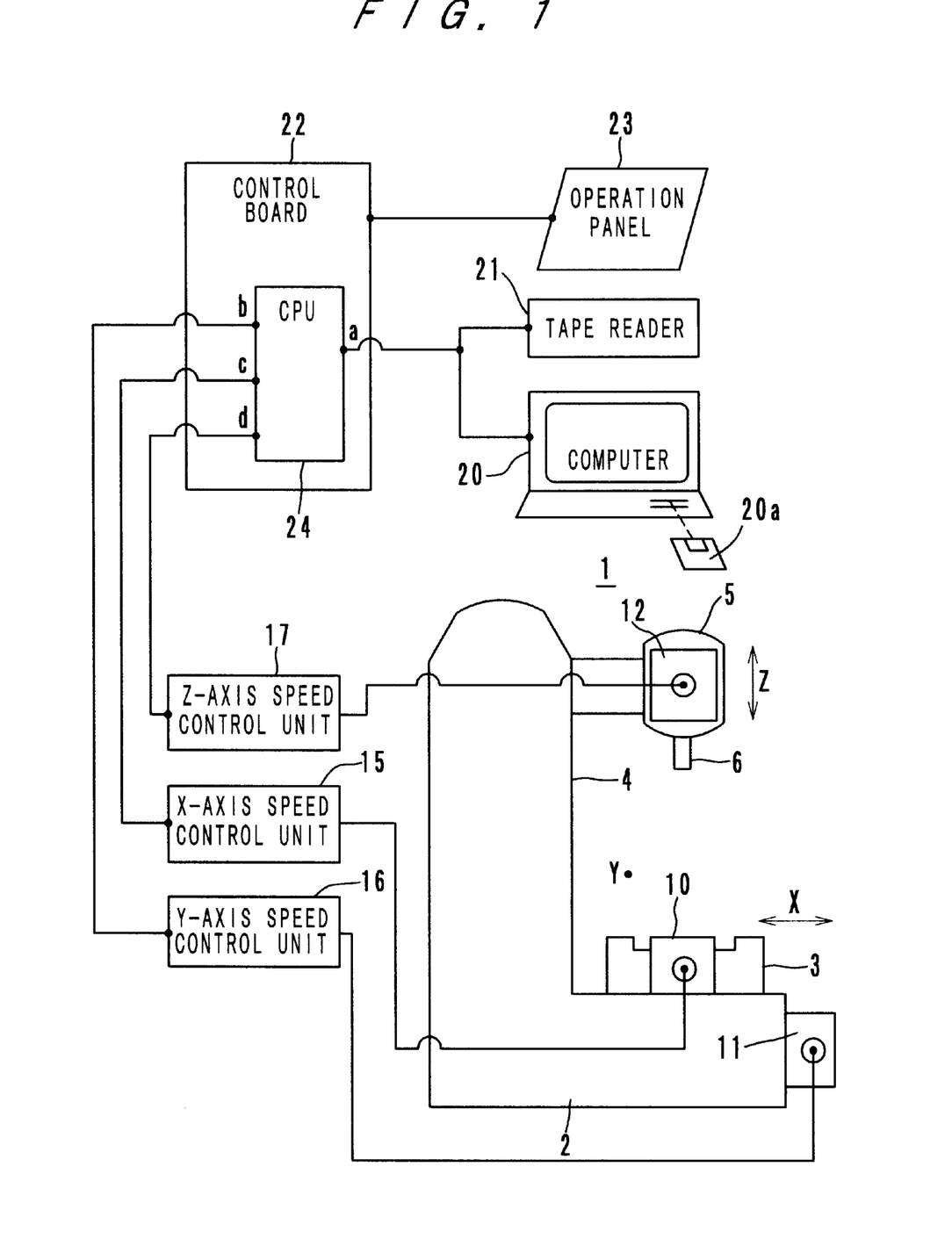
FIG. 1 is a schematic view of a machining apparatus to carry out three-dimensional machining by a method according to the present invention.

FIG. 1 shows the general structure of a machining apparatus to carry out three-dimensional machining according to the present invention. Numeral 1 denotes an apparatus body. The apparatus body 1 has a table 3 on a base 2 and a machining head 5 with a cutting tool 6 on a column 4. The table 3 is moved in the X direction by an X-axis DC motor 10 and moved in the Y direction by a Y-axis DC motor 11. The machining head 5 is moved in the Z direction by a Z-axis DC motor 12. The speed controls of these movements are carried out by sending control signals from control units 15, 16 and 17 to the motors 10, 11 and 12, respectively.

A graphic data processing system is composed of a 16-bit or 32-bit computer 20, a tape reader 21 and a control board 22. The tape reader 21 reads out NC data, specifically, G code as a program format. The user inputs graphic data in the forms of three plane views or a perspective view into the computer 20. The computer 20 transmits a control program stored in a floppy disk 20a to a CPU 24 and carries out operation as will be described later.

The control board 22 has an operation panel 23 and incorporates the CPU 24. The CPU 24 receives graphic data and other data from the computer 20 and the tape reader 21 through an input port a. The CPU 24 produces cutting data from the inputted graphic data and transmits the cutting data as control signals to the control units 15, 16 and 17 through output ports b, c and d, respectively.

The production of the cutting data in the CPU 24 is hereinafter described.

Curved Surface

Figure 2:
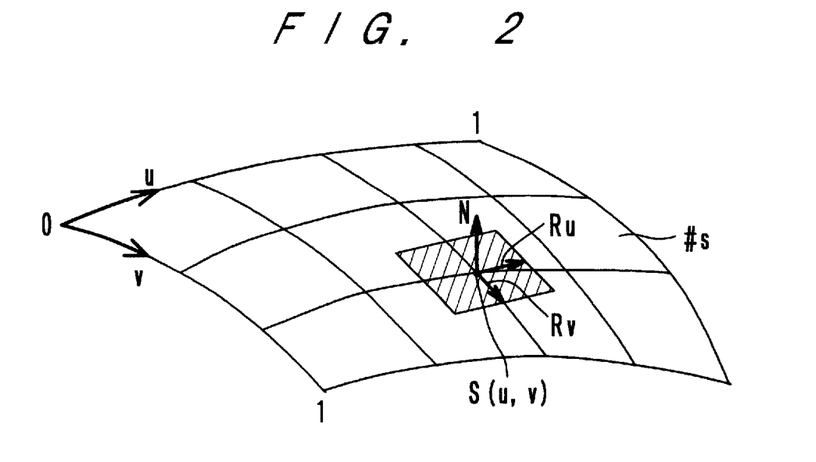
FIG. 2 is an illustration which shows a way of defining a curved surface.

As FIG. 2 shows, a curved surface #s is defined by two parameters u and v which are independent of the rectangular coordinate system. A standard (function) S to designate a point is determined with respect to the parameters u and v ($0 \leq u \leq 1$, $0 \leq v \leq 1$).

When the function S is differentiable (smooth), the function S expresses a curved surface. In this case, the tangential vector for the u direction and the tangential vector for the v direction with respect to a point on the curved surface #s can be expressed as follows:

$$\eta S / \eta u$$

$$\eta S / \eta v$$

Further, the twist vector can be expressed as follows:

$$\eta^2 S / \eta u \eta v$$

The cutting tool 6 has a ball tip with a radius R. Accordingly, the center of the ball tip of the cutting tool 6 should be located at a distance R in the normal direction from the surface. In a case wherein machining is carried out based on paths of the center of the ball tip of the cutting tool 6, it is necessary to figure out the normal vectors with respect to points on the surface.

The tangential vector Ru for the u direction and the tangential vector Rv for the v direction with respect to a point S(u, v) on the curved surface #s are expressed as follows:

$$Ru = \frac{\eta S / \eta u}{|\eta S / \eta u|}$$

$$Rv = \frac{\eta S / \eta v}{|\eta S / \eta v|}$$

A plane including the point S(u, v) and the tangential vectors Ru and Rv is referred to as a tangential plane (shadowed in FIG. 2), and the normal vector N is calculated by N=Ru×Rv. In order to cut the point S(u, v), the center of the ball tip of the cutting tool must be located in a point P calculated as follows:

$$P = S(u,\ v) + \epsilon \cdot R \cdot N \tag{1}$$

$\epsilon^2 = 1$ (+1: normal side, −1: abnormal side)

R: radius of the ball tip of the cutting tool

Since the curved surface #s is a differentiable function with respect to the parameters u and v, the function can be expressed as a rational function or an analytic function. Therefore, in order to figure out a point on the curved surface #s, the solution is calculated algebraicly or analytically.

For example, if a curved surface #a is defined as a cubic spline curved surface by the following expression (2), and if a curved surface #b is defined by the following expression (3), the expressions (2) and (3) can be unified into a rational function (4).

$$a(u,\ v) = \sum_{j=0}^{3} \sum_{i=0}^{3} a_{ji} u^j v^i \tag{2}$$

-continued $$b(u, v) = \frac{\sum_{j=0}^{3}\sum_{i=0}^{4} b_{ji} u^j v^i}{\sum_{j=0}^{3}\sum_{i=0}^{4} b'_{ji} u^j v^i} \quad (3)$$

$$S(u, v) = \frac{f(u, v)}{g(u, v)} \quad (4)$$

$$f(u, v) = \sum_{j=0}^{n}\sum_{i=0}^{m} a_{ji} u^j v^i$$

$$g(u, v) = \sum_{j=0}^{n'}\sum_{i=0}^{m'} b_{ji} u^j v^i$$

Figure 3:
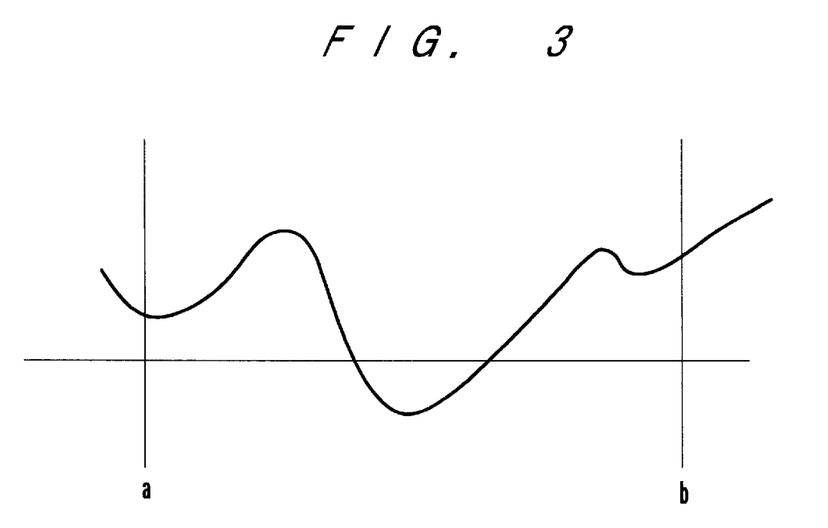
FIG. 3 is a graph which shows an analytical method for figuring out the solution of a rational function.

$a \Rightarrow g(u, v) = 1, \quad f(u, v), \quad u = 3, \quad v = 3$
$b \Rightarrow n = 3, \quad m = 4, \quad v = 3, \quad u' = 3, \quad v' = 4$ FIG. 3 is a graph showing the rational function (4), and the solution is figured out within a range [a, b]. For the calculation, an analytically focusing method is adopted. More specifically, the extremal value and the point of inflection of the rational function are figured out, and the solution is calculated with the initial value set at a point between the extremal value and the point of inflection.

With this process, any forms of functions can be unified into a function with respect to parameters u and v, thereby increasing the processing speed and improving the accuracy of machining.

Figure 4:
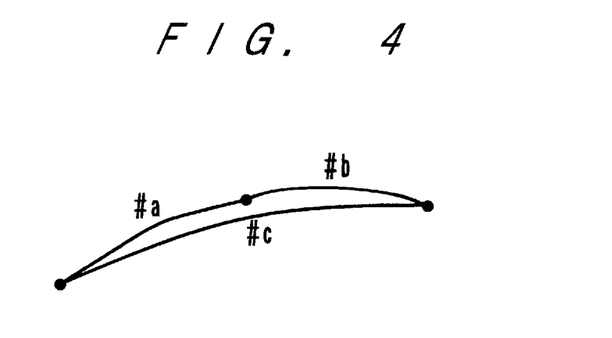
FIG. 4 is an illustration which shows unification of a plurality of curved surfaces.

If a plurality of curved surfaces are defined by rational functions with respect to parameters u and v which are peculiar to the respective surfaces, there may be a case that different curved surfaces are expressed by the same rational function. However, according to the present invention, a plurality of continuous curved surfaces are defined by rational functions with respect to the same parameters u and v, and thereby, the continuous curved surfaces can be unified into a single surface. For example, as FIG. 4 shows, curved surfaces #a and #b which are expressed by rational functions of the same form are unified into a curved surface #c which is expressed by a single rational function. In this way, the number of curved surfaces is decreased, and the calculation time is shortened.

Incidentally, figuring out the curves of intersection between curved surfaces is calculating the solution of simultaneous equations which express the curved surfaces. For example, if curved surfaces #a and #b are expressed by fa(u, v) and fb(u, v), respectively, the solution of an equation fa(u, v)=fb(u, v) is the curve of intersection.

If both the functions fa(u, v) and fb(u, v) are rational functions, this calculation can be carried out by the above-described method. If at least one of the functions is not a rational function, the solution is calculated analytically starting with setting one point on the surface with respect to the parameters u and v. Thus, by using this method of focusing the solution gradually from one point, the answer becomes closer to the solution as desired.

Definition of Curved Surfaces

A curved surface is defined strictly based on graphic data, such as three plane views and a perspective view, provided by the designer. In the views, outline curves and sectional curves, etc. of the surface are provided. From these data, a curved surface definition net is made to embody the curved surface imaged by the designer. The curved surface definition net is composed of many lattice points, and using the definition net, the curved surface is divided into a necessary number of patches. First, rational functions or correspondences to express the respective patches are determined individually, and from the rational functions or the correspondences, a set of functions (a set of rational functions or analytic functions) to express the whole curved surface is determined.

In defining continuous curved surfaces, first, a curved surface definition net is made based on functions which express the respective surfaces. Then, by using the curved surface definition net, the continuous curved surfaces are unified into a single surface, and the unified surface is expressed by a set of functions.

Figure 5:
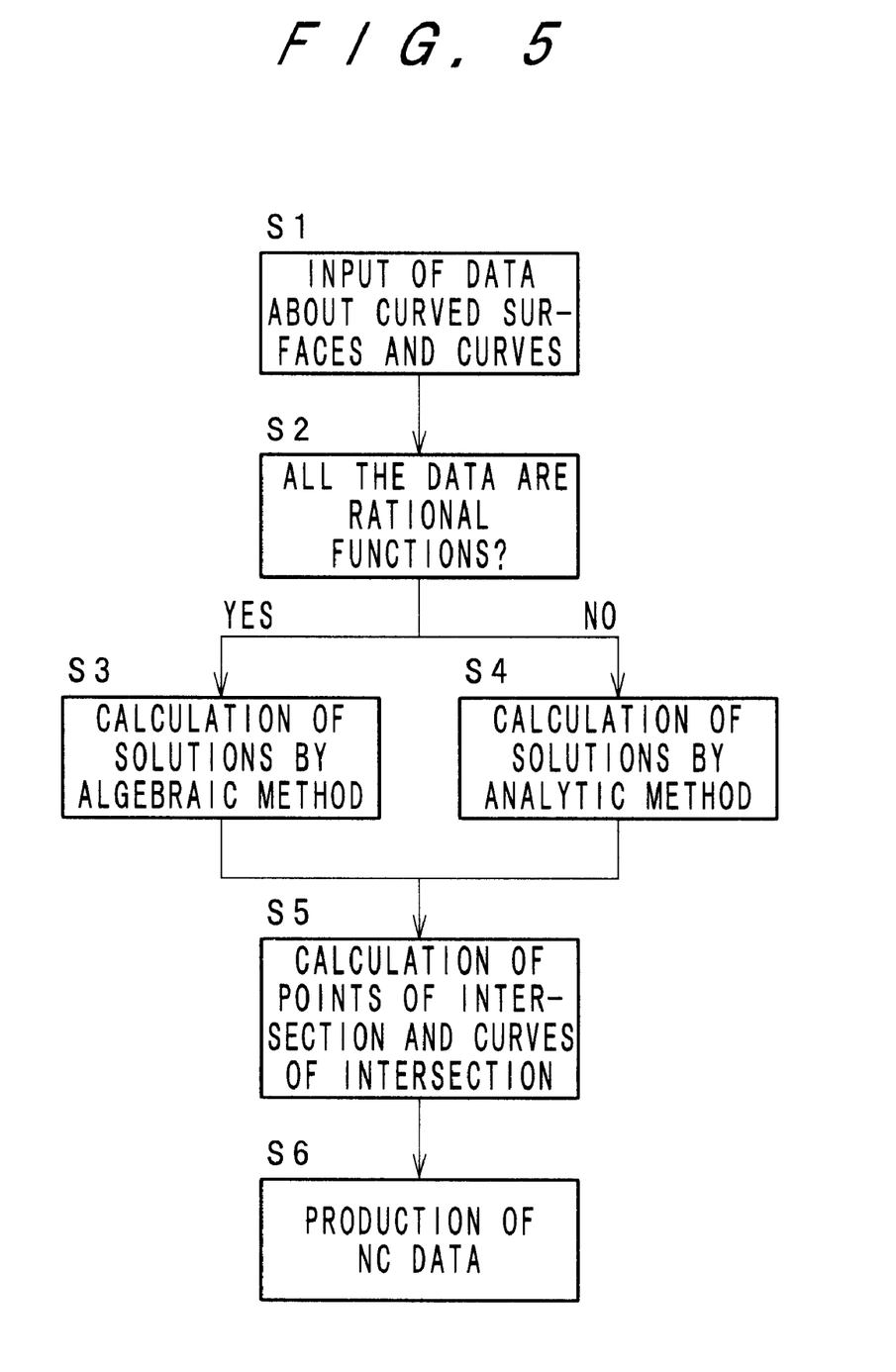
FIG. 5 is a flowchart which shows a procedure in the method of the present invention.

FIG. 5 shows the procedure for definition of continuous curved surfaces. At step S1, CAD data and CAM data which indicate curved surfaces and curves are inputted. At step S2, the data are judged, and more specifically, it is judged whether or not all the curved surfaces and curves inputted at step S1 are expressed by rational functions. If all the curved surfaces and curves are expressed by rational functions, the solutions can be figured out algebraicly, whereas if at least one of the curved surfaces and curves is not expressed by a rational function, the solutions shall be figured out analytically. If all the curved surfaces and curves are expressed by rational functions, an algebraic method is executed to figure out the solutions at step S3. If the data inputted at step S1 includes a curved surface or a curve which is not expressed by a rational function, an analytical method is executed to figure out the solutions at step S4. The solutions figured out at step S3 or at step S4 are defined by a set of functions with respect to parameters u and v. Then, the points of intersection and the curves of intersection are calculated at step S5, and paths of the center of the ball tip of the cutting tool 6, that is, NC data are generated at step S6.

1. Curved Surface Definition Net

A curved surface is defined from curves which are provided as graphic data by the designer. To recognize the shape of the curved surface, a curved surface definition net is made of many lattice points. The curved surface is divided by u-curves and v-curves in a u-direction and in a v direction which are peculiar to the surface. Supposing that the number of u-curves and the number of v-curves are m and n respectively, intersections of the u curves and the v curves are expressed as follows:

$$u_0 = 0 < u_1 < \ldots < u_m = 1$$

$$v_o = 0 < v_1 < \ldots < v_n = 1$$

With respect to each of the intersections $S(u_j, v_i)$, the tangential vector for the u direction $Su(u_j, v_i)$, the tangential vector for the v direction $Sv(u_j, v_i)$ and the twist vector $Suv(u_j, v_i)$ are determined. At that time, the tangential vectors and the twist vector are figured out based on:

$$Su(u, v) = \eta S/\eta u$$

$$Sv(u, v) = \eta S/\eta v$$

$$Suv(u, v) = \eta^2 S/\eta u \eta v$$

Figure 6:
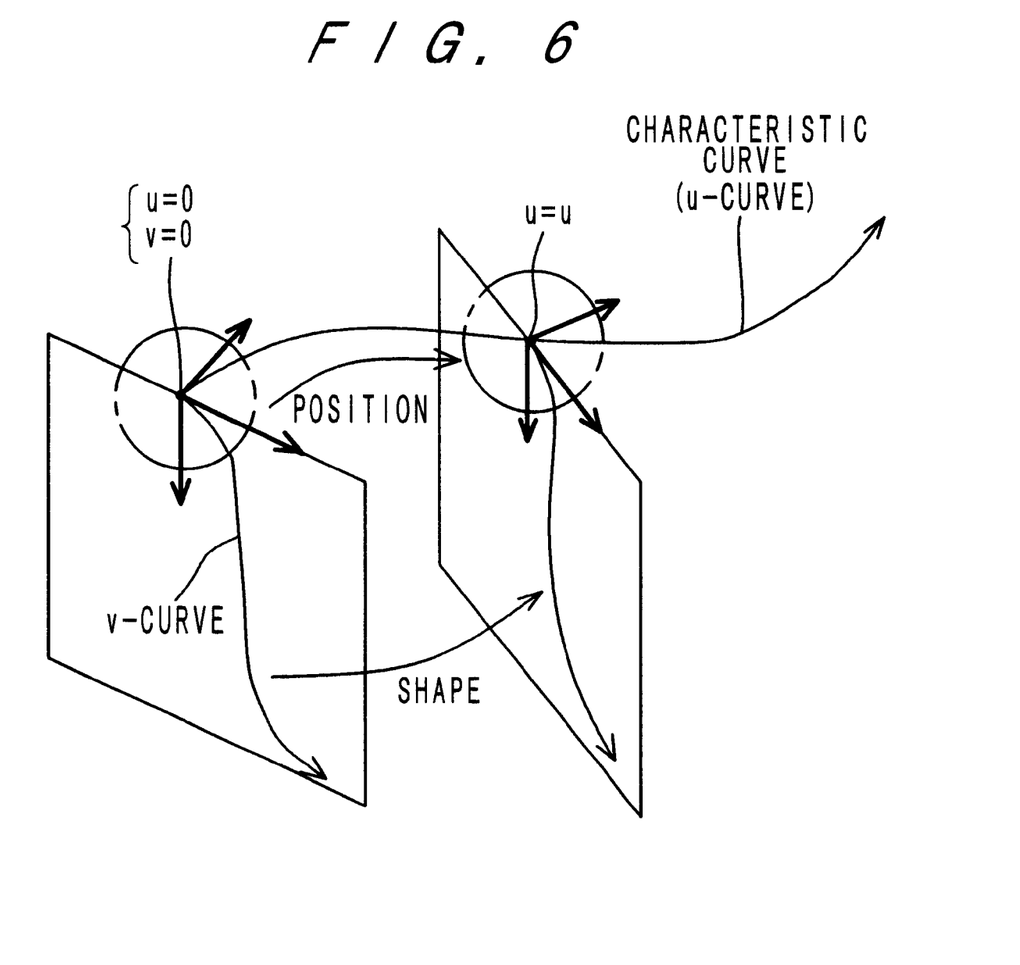
FIG. 6 is an illustration which shows another way of defining a curved surface.

In order to make such a curved surface definition net, a differential standard (function) with respect to the parameters u and v is determined. As FIG. 6 shows, a curved surface is regarded to be made by moving a v-curve along a u-curve changing its shape. When the provided graphic data include a sectional curve, the sectional curve is handled as the v-curve. The v-curve is regarded to move along the u-curve changing its shape differentially, and a differential function S is determined from the u-curve and the v-curve.

Then, a point S(u, v) is defined by the function S, and the tangential vector Su for the u direction, the tangential vector Sv for the v direction and the twist vector Suv with respect to the point S(u, v) are calculated. Thus, the v-curve changes its shape and its position with respect to the u-curve. In other words, a matrix (directions) which determines the shape and the position changes differentially.

Within a range $0 \leq u \leq 1$ and $0 \leq v \leq 1$, points on the surface can be defined by the function S, and a curved surface definition net is composed of these points.

2. Functions to Express a Curved Surface

Based on the curved surface definition net, the shape of each patch to be machined is determined, and in each patch expressed by $u_{j-1} \leq u \leq u_j$ and $v_{i-1} \leq v \leq v_i$, a function $S_{ji}$ with respect to parameters u and v is figured out. By combining the functions $S_{ji}$ which express the respective patches, the curved surface is defined. In figuring out the functions, the following conditions must be fulfilled:

(1) the functions must meet the provided graphic data, and more particularly must meet curves and values (dimensions, angles, etc.) shown in the provided drawings; and (2) the functions must sufficiently meet the designer's intention, that is, must express the sufficiently accurate surface as designed.

When a curved surface is defined as a combination of functions which express the respective patches of the curved surface, the functions must be differentiable at the borders among the patches. According to the present invention, with respect to each lattice point $S(u_j, v_i)$ of the curved surface definition net, the tangential vector $Su(u_j, v_i)$ for the u direction, the tangential vector $Sv(u_j, v_i)$ for the v direction and the twist vector $Suv(u_j, v_i)$ are calculated. Based on the vectors Su, Sv and Suv with respect to the respective lattice points (border points), functions to express the respective patches are determined. The functions obtained in this way are differentiable at the borders.

The provided graphic data sometimes include only some passing points. In this case, it is impossible to calculate the vectors Su, Sv and Suv from the provided data. In this case, a function to express a patch is determined in consideration for the neighboring patches. In other words, a set of functions to express the curved surface is determined in consideration for the mutual relationships among the patches.

3. Unification of Continuous Curved Surfaces

Any curved surface is defined in a coordinate system which reflects the characteristics of the surface. Conventionally, curved surfaces which have distinct characteristics are defined as separate curved surfaces. Therefore, when a complicated shape is to be machined, a larger number of curved surfaces must be defined, thereby increasing the volume of processing. According to the present invention, continuous curved surfaces which have mutually distinct characteristics are unified into a single curved surface and expressed by a set of analytic functions.

Now, suppose that continuous curved surfaces S and S' are expressed by a set of functions with respect to parameters u and v and by a set of functions with respect to parameters u' and v', respectively. If a u-curve of the curved surface S intersects the curved surface S' at a point P(u, v)($0 \leq u$), the intersection P can be also expressed by the parameters of the curved surface S' as P=S'(u', v'). Here, [Su(u, v), S'u(u', v')]≧[Su(u, v), S'v(u', v')] is supposed. The u-curve of the surface S is connected to a u'-curve of the surface S' at the intersection P. Consequently, a curve which includes the u-curve of the curved surface S from u=0 to u=u and the u'-curve of the curved surface S' from u=u' to u=1 is newly made. In the same manner, n curves are newly made, and every curve is defined into m sections. Thus, a curved surface definition net with respect to the curved surfaces S and S' is made. Based on the curved surface definition net, the curved surfaces S and S' can be defined as a single curved surface, and moreover, the newly defined curved surface keeps the characteristics of both the surfaces S and S'.

Paths of the Cutting Tool

After the definition of a curved surface, the cutting tool 6 moves to machine the curved surface. The cutting tool has a ball tip of a radius R, and the center of the ball tip should be located at a distance R vertically from the surface. The location of the center P of the ball tip is calculated by the aforementioned expression (1).

In moving the cutting tool 6 along a curve on a curved surface S, a path of the center of the ball tip of the tool 6 is generated by calculating points P at the distance R from the curve by using the expression (1). Conventionally, with respect to every cutter location, a point P at the distance R in the normal direction, that is, the normal vector N (see FIG. 2) is calculated. When the curved surface S is not expressed by an expression, in order to calculate the normal vector N with respect to a cutter location, other two points must be figured out. For these reasons, generation of paths of the center of the ball tip is conventionally complicated and takes a long time.

According to the present invention, however, with respect to only the intersections $(u_j, v_i)$ of u-curves and v-curves which form the curved surface definition net, points P at the distance R in the normal direction are calculated by using the expression (1). Then, from the points P, a curved surface definition net for an offset surface *S of the surface S is made. Based on the curved surface definition net, a set of functions to express the offset surface *S on which the center of ball tip moves is determined. The functions must meet the following condition:

$$*S(u, v)=S(u, v)+\epsilon \cdot R \cdot N (0 \leq u \leq 1, 0 \leq v \leq 1) \quad (5)$$

The functions calculated according to the present invention meet the condition within an allowable error. It is no longer necessary to calculate a larger number of points P at a distance R from the surface S by using the expression (1). In the present method, paths of the center of the ball tip of the cutting tool are generated by calculating points *S(u, v) on the offset surface *S by using the functions, which is easy and increases the processing speed.

Although the present invention has been described in connection with the preferred embodiment, it is to be noted that various changes and modifications are possible to those who are skilled in the art. Such changes and modifications are to be understood as being within the scope of the present invention.

What is claimed is:

1. A three-dimensional machining method for machining a workpiece in mutually rectangular directions along an x-axis, a y-axis and a z-axis with a programmed computer, the method comprising the steps of:

inputting functions in a plurality of forms which express a plurality of curved surfaces and curves;

judging whether solutions of the functions can be figured out by an algebraic method or an analytic method;

calculating the solutions by an algebraic method or an analytic method depending on the judgement and defining the plurality of curved surfaces by a set of functions with respect to parameters u and v;

calculating points P on which a center of a cutting tool with a radius R is to be located by figuring out a normal vector N of a point S(u, v) on the surface expressed by the set of functions, using the following expression:

$$P=S(u, v)+\epsilon \cdot R \cdot N$$

wherein, $\epsilon^2=1$ where +1 indicates a normal side and −1 indicates an abnormal side; and moving the cutting tool along the points P to machine the workpiece.

2. A medium which is stored with a three-dimensional machining control program for computerized three-dimensional machining of a workpiece, said program comprising the steps of:

receiving functions in a plurality of forms which express a plurality of curved surfaces and curves;

judging whether solutions of the functions can be figured out by an algebraic method or an analytic method;

calculating the solutions by an algebraic method or an analytic method depending on the judgement and defining the plurality of curved surfaces by a set of functions with respect to parameters u and v;

calculating points P on which a center of a cutting tool with a radius R is to be located by figuring out a normal vector N of a point S(u, v) on the surface expressed by the set of functions, using the following expression:

$$P=S(u, v)+\epsilon \cdot R \cdot N$$

wherein, $\epsilon^2=1$, where +1 indicates a normal side and −1 indicates an abnormal side; and calculating intersections which are necessary for machining.

3. The three-dimensional machining method according to claim 1, wherein inputting said functions in the plurality of forms includes inputting rational functions and analytical functions.

4. The three-dimensional machining method according to claim 1, wherein the algebraic method determines solutions if all functions are rational functions and the analytic method determines solutions if at least one of the functions is not a rational function.

5. The three-dimensional machining method according to claim 3, wherein the algebraic method determines solutions if all functions are rational functions and the analytic method determines solutions if at least one of the functions is not a rational function.

6. The program according to claim 2, wherein receiving said functions in the plurality of forms includes receiving rational functions and analytical functions.

7. The program according to claim 2, wherein the algebraic method determines solutions if all functions are rational functions and the analytic method determines solutions if at least one of the functions is not a rational function.

8. The program according to claim 6, wherein the algebraic method determines solutions if all functions are rational functions and the analytic method determines solutions if at least one of the functions is not a rational function.

9. A three-dimensional machining method for machining a workpiece in mutually rectangular directions along an x-axis, a y-axis and a z-axis with a programmed computer, the method comprising the steps of:

inputting functions in a plurality of forms which express a plurality of curved surfaces and curves, said functions including rational functions and analytical functions;

determining whether solutions of the functions can be figured out by one of an algebraic method and an analytic method;

calculating the solutions by one of the algebraic method and the analytic method depending on the determination and defining the plurality of curved surfaces by a set of functions with respect to parameters u and v;

calculating points P on which a center of a cutting tool with a radius R is to be located by figuring out a normal vector N of a point S(u, v) on the surface expressed by the set of functions, using the following expression:

$$P=S(u, v)+\epsilon \cdot R \cdot N$$

wherein, $\epsilon^2=1$ where +1 indicates a normal side and −1 indicates an abnormal side; and moving the cutting tool along the points P to machine the workpiece.

10. A three-dimensional machining method according to claim 9, wherein the algebraic method determines solutions if all functions are rational functions and the analytic method determines solutions if at least one of the functions is not a rational function.

11. A medium which is stored with a three-dimensional machining control program for computerized three-dimensional machining of a workpiece, said program comprising the steps of:

receiving functions in a plurality of forms which express a plurality of curved surfaces and curves, said functions including rational functions and analytical functions;

determining whether solutions of the functions can be figured out by one of an algebraic method and an analytic method;

calculating the solutions by one of the algebraic method and the analytic method depending on the determination and defining the plurality of curved surfaces by a set of functions with respect to parameters u and v;

calculating points P on which a center of a cutting tool with a radius R is to be located by figuring out a normal vector N of a point S(u, v) on the surface expressed by the set of functions, using the following expression:

$$P=S(u, v)+\epsilon \cdot R \cdot N$$

wherein, $\epsilon^2=1$ where +1 indicates a normal side and −1 indicates an abnormal side; and calculating intersections which are necessary for machining.

12. The program according to claim 11, wherein the algebraic method determines solutions if all functions are rational functions and the analytic method determines solutions if at least one of the functions is not a rational function.

13. A three-dimensional machining method for machining a workpiece in mutually rectangular directions along an x-axis, a y-axis and a z-axis with a programmed computer, the method comprising the steps of:

inputting functions in a plurality of forms which express a plurality of curved surfaces and curves;

determining whether solutions of the functions can be figured out, based upon whether at least one of the functions is not a rational function, by one of an algebraic method and an analytic method;

calculating the solutions by one of the algebraic method and the analytic method depending on the determination and defining the plurality of curved surfaces by a set of functions with respect to parameters u and v;

calculating points P on which a center of a cutting tool with a radius R is to be located by figuring out a normal vector N of a point S(u, v) on the surface expressed by the set of functions, using the following expression:

$$P = S(u, v) + \epsilon \cdot R \cdot N$$

wherein, $\epsilon^2 = 1$ where +1 indicates a normal side and −1 indicates an abnormal side; and moving the cutting tool along the points P to machine the workpiece.

14. The three-dimensional machining method according to claim 13, wherein inputting said functions in the plurality of forms includes inputting rational functions and analytical functions.

15. The three-dimensional machining method according to claim 13, wherein the algebraic method determines solutions if all functions are rational functions and the analytic method determines solutions if at least one of the functions is not a rational function.

16. The three-dimensional machining method according to claim 14, wherein the algebraic method determines solutions if all functions are rational functions and the analytic method determines solutions if at least one of the functions is not a rational function.

17. A medium which is stored with a three-dimensional machining control program for computerized three-dimensional machining of a workpiece, said program comprising the steps of:

receiving functions in a plurality of forms which express a plurality of curved surfaces and curves;

determining whether solutions of the functions can be figured out, based on whether at least one of the functions is not a rational function, by one of an algebraic method and an analytic method;

calculating the solutions by one of the algebraic method and the analytic method depending on the determination and defining the plurality of curved surfaces by a set of functions with respect to parameters u and v;

calculating points P on which a center of a cutting tool with a radius R is to be located by figuring out a normal vector N of a point S(u, v) on the surface expressed by the set of functions, using the following expression:

$$P = S(u, v) + \epsilon \cdot R \cdot N$$

wherein, $\epsilon^2 = 1$ where +1 indicates a normal side and −1 indicates an abnormal side; and calculating intersections which are necessary for machining.

18. The program according to claim 17, wherein receiving said functions in the plurality of forms includes receiving rational functions and analytical functions.

19. The program according to claim 17, wherein the algebraic method determines solutions if all functions are rational functions and the analytic method determines solutions if at least one of the functions is not a rational function.

20. The program according to claim 18, wherein the algebraic method determines solutions if all functions are rational functions and the analytic method determines solutions if at least one of the functions is not a rational function.

* * * * *